(No Model.)
T. W. R. McCABE.
Hoisting Machine.
No. 231,966.   Patented Sept. 7, 1880.
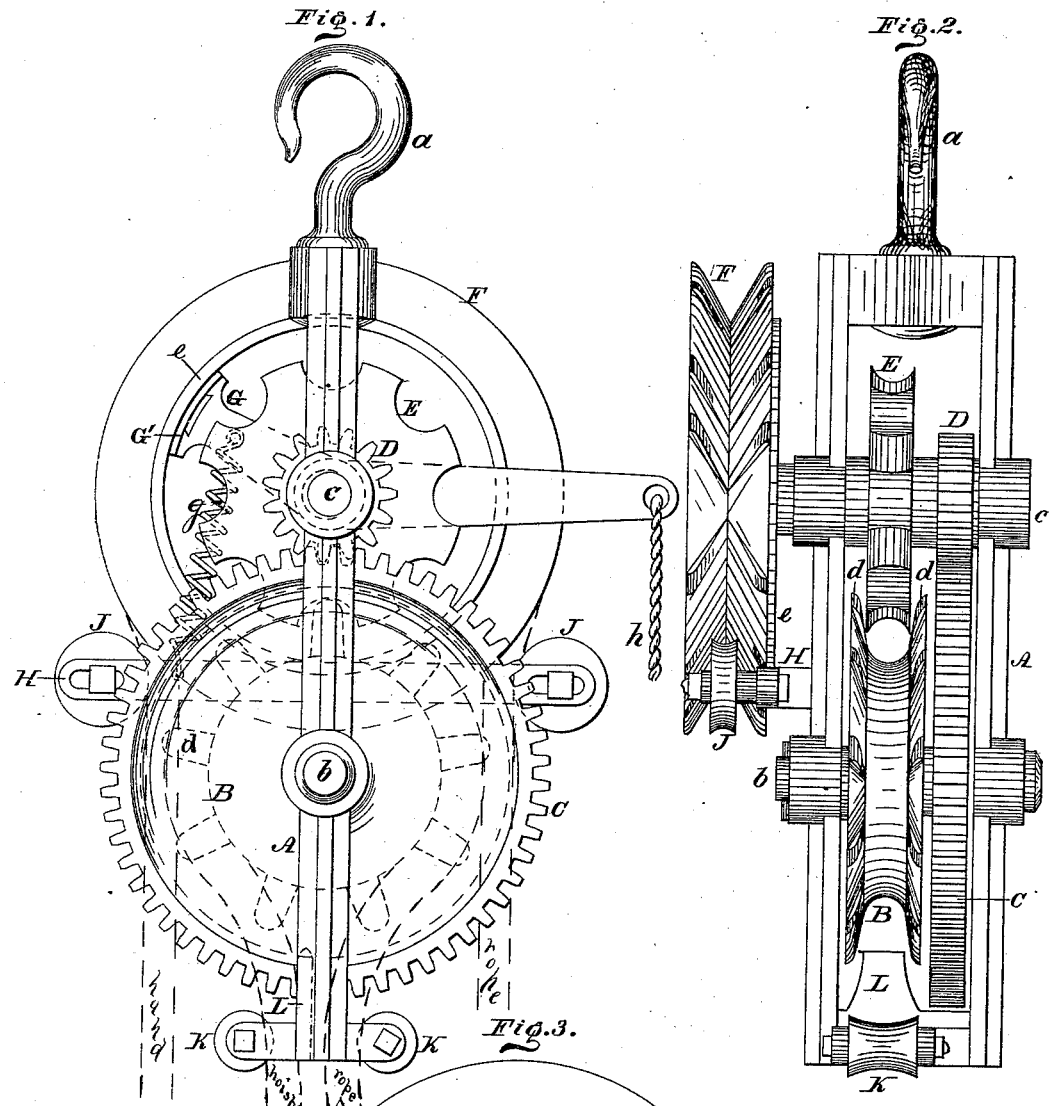
Witnesses:
A. P. Grant,
W. F. Kircher
Inventor:
Thos. W. R. McCabe,
by John A. Wiedersheim
ATTORNEY.
N. PETERS, PHOTO-LITHOGRAPHER, WASHINGTON, D. C.

UNITED STATES PATENT OFFICE.

THOMAS W. R. McCABE, OF PHILADELPHIA, PA., ASSIGNOR OF ONE-HALF OF HIS RIGHT TO H. C. WRIGHT AND H. C. SELBY, OF SAME PLACE.

HOISTING-MACHINE.

SPECIFICATION forming part of Letters Patent No. 231,966, dated September 7, 1880.

Application filed April 14, 1880. (No model.)

*To all whom it may concern:*

Be it known that I, THOMAS W. R. MCCABE, a citizen of the United States, residing in the city and county of Philadelphia, and State of Pennsylvania, have invented a new and useful Improvement in Hoisting-Machines, which improvement is fully set forth in the following specification and accompanying drawings, in which—

Figure 1 is a side elevation of the hoisting-machine embodying my invention. Fig. 2 is an end view thereof. Fig. 3 is a detached view of a portion of Fig. 1.

Similar letters of reference indicate corresponding parts in the several figures.

This invention relates to hoisting-machines; and it consists in the construction and arrangement of parts hereinafter particularly set forth.

Referring to the drawings, A represents a frame, provided at top with a swivel-hook, a, or other means for suspending the machine or apparatus.

B represents the pulley for the hoisting-rope, the same being secured to or cast with a pinion, C, which, with the pulley, has its axis on a shaft, b, connected to the frame A.

Meshing with the pulley B is a pinion, D, which is keyed or otherwise fixed to a shaft, c, whose bearings are on the frame A above the shaft b. On said shaft c is loosely fitted a binding-wheel, E, which consists of a wheel having a scalloped, corrugated, or toothed perimeter, which projects into the groove of the pulley B, the sides of said groove being toothed, as at d, the binding-wheel E being so set that when running its teeth will alternate with those of the pulley B. The pulley B and binding-wheel E, and preferably the pinions C D, are within the sides of the frame A.

The shaft c is extended beyond its bearings on one side of the frame A, and has connected to the extended end the hand-rope wheel F, on the side of which is a rim, e, against which bears the shoe of a brake, G, which is mounted on an eccentric axis, f. A spring, g, is connected to the brake and a proper part of the frame A for the purpose of pressing the brake-shoe against the rim e, and a cord or chain, h, is attached to the end of the brake-lever for the purpose of releasing the brake.

H represents an arm which is secured to the frame A, and supports on each end a guide-wheel, J, arranged in proximity to the periphery of the wheel F, said wheels being adjustable on the arm and adapted to keep the hand-rope on the wheel F and prevent displacement thereof, and also hold said rope as much as possible against the wheel F, especially near to the place where it is about to leave the wheel, thus preventing slipping of the rope.

At the bottom of the frame A are secured two wheels, K, by which the hoist-rope is guided as it runs, passing on and off the wheel B; and rising from the frame between the wheels is a guide-piece or deflector, L, which serves to separate the two lengths of rope and prevent fouling thereof.

It will be seen that when the hand-rope is drawn the wheel F is rotated. This imparts motion to the gearing D C, and consequently to the wheel B, around which the hoist-rope is passed, thus raising said rope and elevating the load.

As the rope moves over the wheel B the binding-wheel, which is in contact with the former, is rotated and presses the rope firmly against the wheel B, the rope being bound, as it were, between the teeth of the wheel E and teeth of the wheel B, so that slipping of the rope is prevented and the load will be safely and reliably elevated.

Owing to the eccentric axis of the brake G the shoe G' yields with the motion of the wheel F; but whenever said motion is stopped the brake immediately expands and binds on the rim e and locks the wheel F, preventing reverse or running-down motion of the latter, and consequently of the load.

The shoe G' is removable from the brake for purposes of repairs, replenishing, &c.

If desired, more than one binding-wheel E may be mounted on the frame A, so as to circumscribe the hoist-wheel B and bear against the rope thereon.

Having thus described my invention, what I claim as new, and desire to secure by Letters Patent, is—

1. In combination with hand-rope wheel F, grooved wheel B, and frame A, fixed with relation to said wheel, the scalloped binding-wheel E, journaled in said frame, which works into the groove of wheel B, and operates at all times to prevent the rope from slipping, substantially as set forth.

2. The expanding brake G, in combination with hand-wheel F, having rim $e$, the binding-wheel E, and gear-wheel D, all of said parts being carried by shaft $c$.

3. The load or hoist rope B, in combination with the deflector L and guides K, substantially as and for the purpose set forth.

T. W. R. McCABE.

Witnesses:
 JOHN A. WIEDERSHEIM,
 A. P. GRANT.